July 7, 1959  T. L. BLOSE  2,893,759
CONICALLY TAPERED SCREW-TYPE CASING JOINT WITH METAL-TO-METAL SEAL
Filed May 6, 1957
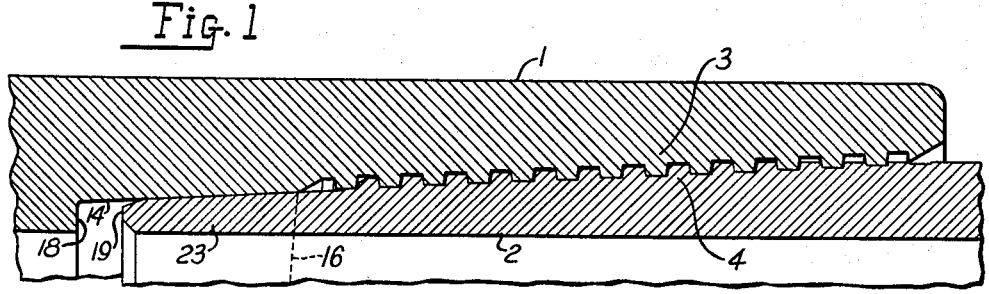
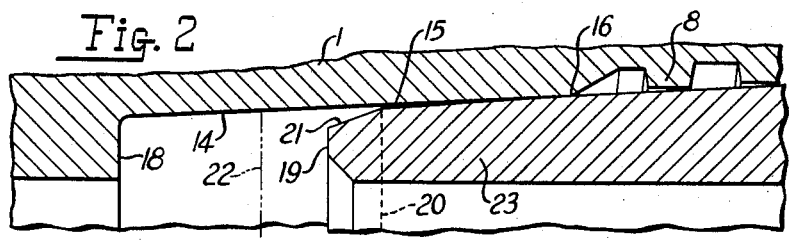
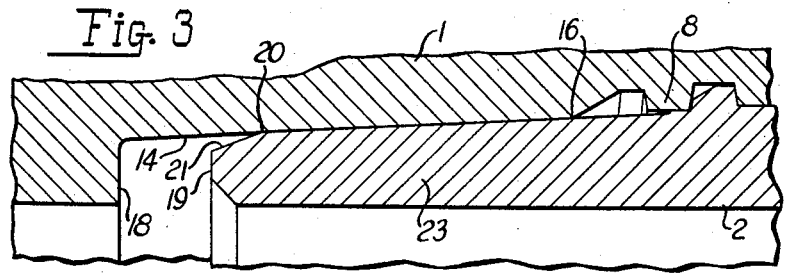
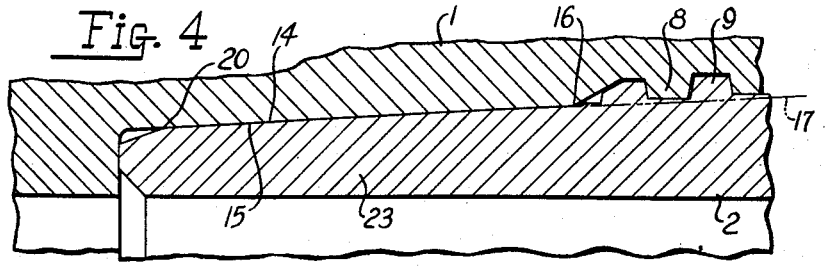
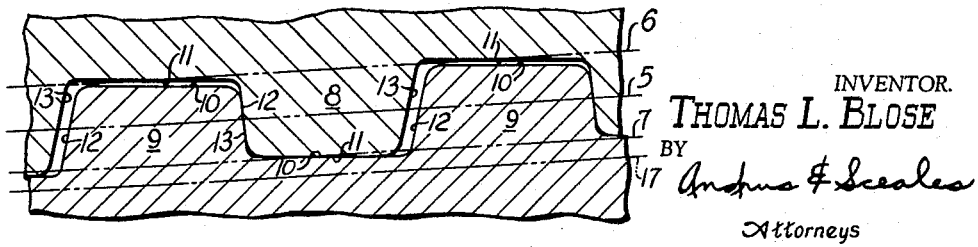
INVENTOR.
THOMAS L. BLOSE
BY
Andrus & Sceales
Attorneys ved July 7, 1959

2,893,759

CONICALLY TAPERED SCREW-TYPE CASING JOINT WITH METAL-TO-METAL SEAL

Thomas L. Blose, Houston, Tex., assignor to A. O. Smith Corporation, Milwaukee, Wis., a corporation of New York Application May 6, 1957, Serial No. 657,187

1 Claim. (Cl. 285—334)

This invention relates to certain improvements in casing joints.

The search for oil and gas reserves has brought about the exploration of ever deeper formations. These deeper formations require longer strings of casing pipe and are producing both oil and gas at extremely high pressures. This increased length of casing strings imposes the upper portion of the string to very high tensile loads and the higher pressures from the deeper formations also exposes the upper portion of the string to high internal pressures where there is little or no offsetting external pressure on the casing. With standard joints there are limitations to the depths to which a string of casing can run. Merely increasing the wall thickness of the casing having a standard joint to carry the higher tensile loads is to a great extent self-defeating in view of the increased load weight imposed on the string. Thus, it is imperative that the casing joints be improved and made more efficient to withstand the high pressures and tensile loads. This invention is directed to such improved joints for casing pipe and since the joints of the casing would be the same throughout, only one joint need be described.

The casing joint of this invention includes a female or box member and a mating male or pin member which are coupled together. The box member is provided with an internally threaded portion adjacent the end thereof while the pin member is provided with a complementary externally threaded portion spaced axially inwardly from the end thereof. The box member is provided with a conical sealing surface which extends axially inwardly from the threaded portion and the pin member is likewise provided with a conical sealing surface which extends from the threaded portion thereof axially inwardly toward the end of the pin member. The sealing surface of the pin is provided with a faster taper than that of the box sealing surface so that upon joint make-up a line contact is initially established between the sealing surfaces and upon further make-up at least one of the members is deformed radially to generate a surface contact between the sealing surfaces. The structure of this invention provides a high strength, leak-resistant joint which is better adapted to withstand the high pressures and tensile loads encountered in the exploration of deep formations.

The drawing furnished herewith illustrates the best mode of carrying out the invention as presently contemplated and set forth hereinafter.

In the drawing:

Figure 1 is a longitudinal section of a fully made-up casing pipe joint embodying the principles of the invention with only half of the joint being shown and the rest being broken away;

Fig. 2 is an enlarged fragmentary longitudinal section of the partially made-up joint showing the initial line contact established between the conical sealing surfaces of the coupling members;

Fig. 3 is a view similar to that of Fig. 2 showing the surface contact generated between the conical sealing surfaces of the coupling members after normal make-up;

Fig. 4 is a view similar to that of Fig. 2 showing the coupling members after full make-up with the pin member engaging the internal shoulder of the box member; and Fig. 5 is an enlarged fragmentary section showing certain details of thread construction.

Referring to the drawing, the casing joint comprises a cylindrical female or box member 1 coupled with a cylindrical male or pin member 2. The members 1 and 2 may be formed integrally on the ends of adjacent casing members, not shown, for coupling the casing members directly together, or one of the casing joint members may be formed integrally on a double ended coupling element, not shown, where a coupling element is disposed between adjacent lengths of casing pipe.

The box and pin members 1 and 2 are provided with complementary internal and external threaded portions 3 and 4, respectively, which are disposed along a relatively steep uniformly tapered thread pitch cone indicated by the dot-dash line 5 as shown in Fig. 5. The threaded portion 4 on the pin member 2 is spaced axially outwardly from the inner end of the pin so that in coupled relation an unthreaded portion of the pin member will extend well into the box member 1, as will be explained hereinafter.

The thread root cones, shown by dot-dash lines 6 and 7 in Fig. 5 for the threaded portions 3 and 4, respectively, parallel the pitch cone 5 and are spaced substantially equidistant therefrom.

The threads 8 of threaded portion 3 of box member 1 and threads 9 of threaded portions 4 of pin 2 are of a rugged modified acme type capable of withstanding considerable abuse in handling and makeup. The crests 10 and roots 11 of threads 8 and 9 parallel the axis of the joint. The forward flanks 12 of threads 8 and 9, respectively, are disposed at a relatively steep angle with about six degrees from radial being preferred. Flanks 12 make contact first upon make-up and frequently with a jolt and their near radial surfaces prevent wedging effects from heavy stabbing. Upon further make-up of the joint and as shown particularly in Fig. 5, the front flanks 12 move out of contact so that if these surfaces are damaged during stabbing it will have no effect on the make-up of the joint. As further shown in Fig. 5, the rear flanks 13 of the respective threads 8 and 9 are also disposed at a relatively steep angle, again about six degrees from radial. The thread design provides that the rear flanks 13 are drawn together upon threading. By providing steep flank angles the radial component tending to expand the box member 1 and compress the pin member 2 due to the tensile load of the casing length on the joint is minimized, thereby minimizing the cause for thread "jump outs." The thread design further provides that the crests 10 of thread 8 bottoms against roots 11 of thread 9 with clearance being provided between the crests 10 of thread 9 and roots 11 of thread 8. These clearances between thread height and thread width of the mating threads 8 and 9 provides some latitude in manufacturing tolerances tending to minimize machining costs.

To further increase the joint strength in tension, the thread roots 11 of pin member 2 run out to the full outside diameter of the member. Thus, thread engagement between members 1 and 2 is maximized and the tensile load transmitted through the fully made-up joint is carried by the greatest cross-sectional area of the pipe to minimize the unit stress therein.

The box member 1 is also provided with a relatively long conical sealing surface 14 substantially complementary to a corresponding sealing surface 15 on pin member 2. The sealing surface 14 on box member 1 extends axially inwardly from the circumferential line 16 adjacent the end of threaded portion 3 and parallels the thread root cones shown by dot-dash lines 6 and 7 and is shown by the dot-dash line 17 in Fig. 4 and Fig. 5 which indicates the sealing cone extension. Sealing surface 14 is also offset radially inwardly from the thread root cone 7 of threaded portion 4, as also shown in Fig. 5. The sealing surface 14 terminates at the radially extending shoulder 18 which upon full make-up of the joint is engaged by the end 19 of the pin member 2.

As illustrated in the drawings, the conical sealing surface 15 on the pin member 2 extends axially outwardly from the threaded portion 4 a distance equal to at least twice the pitch of threads 9 and to a circumferential line 20 where the sealing surface intercepts the somewhat steeper conical relief surface 21 provided adjacent end 19 of the pin member. As clearly shown in Fig. 2, the sealing surface 15 is provided with a faster taper than the substantially complementary sealing surface 14 on box member 1 so that as the joint is made up a line contact seal on a circumferential line is initially established between the sealing surfaces 14 and 15 through the line 16, located at the end of sealing surface 14 adjacent the last thread on member 1. Upon further make-up of the members to the nominal make-up position shown in Fig. 3, a surface contact is generated between the sealing surfaces 14 and 15 until line 20 on surface 15 contacts surface 14 at line 22 as shown by dot-dash line in Fig. 2, the circumferential lines 20 and 22 being a like distance from the axis of the joint. Thus, upon make-up from the initial circumferential line contact seal shown in Fig. 2 to the nominal make-up position shown in Fig. 3, either or both of the sealing surfaces 14 and 15 are deformed radially between lines 20 and 16 on the respective members to accommodate the faster taper on the sealing surface 15.

The interference developed between sealing surfaces 14 and 15 establishes a normal pressure therebetween particularly adapted to resist leakage. Another function of the radial deformation is to entrap small particles of lubricant between the sealing surfaces during make-up of the joint and thus effectively reduce any tendency to gall therebetween.

The casing joint is considered to be fully made-up when the members 1 and 2 are threaded together to an extent where the end 19 on member 2 is disposed between its position for nominal make-up as shown in Fig. 3, and the shoulder 18. In practice, however, shoulder 18 serves as a stop, signaling the fully made-up position of the joint and presents a safeguard against over-tonging with possible damage to the threads. In moving from the nominal to the fully made-up position, the sealing surface area between the members 1 and 2 is extended as circumferential line 20 on sealing surface 15 moves axially inwardly toward shoulder 18. With line 20 on sealing surface 15 generally coinciding with line 22 on sealing surface 14 in the nominal position, further radial deformation takes place between the surfaces 14 and 15 over the full length of the contact area as the line 20 advances toward shoulder 18 to attain full make-up of the joint.

There is a further advantage in having end 19 engage the shoulder 18 in the fully made-up position in that the cylindrical casing portion 23 of member 2 beneath the sealing surface 15 will be placed under axial compression tending to increase the radial normal pressure between the mating or contacting seal surfaces 14 and 15 to further increase the resistance to leakage between the sealing surfaces. The relatively thin wall of casing portion 23 further lends itself to some cylindrical deformation with respect to axial alignment with the mating sealing surface 14 of the box member 1.

The invention provides a high strength leak-resistant casing joint particularly adapted for oil and gas exploration in ever deeper formations. The premium joint includes members having thread form and sealing surfaces which are adapted to be machined simultaneously by conventional chasing or milling methods.

Various modes of carrying out the invention are contemplated as being within the scope of the following claim particularly pointing out and distinctly claiming the subject matter which is regarded as the invention.

I claim:

In a well casing joint embodying male and female members having engageable threads disposed on a taper with the threads having crest and root portions, a first conical sealing surface provided on the female member axially inwardly of said threads and disposed on a taper paralleling the taper of said threaded portions and offset radially inwardly from the thread crests of the threaded portion on the female member, and a substantially complementary second conical sealing surface having an axial length equal to at least twice the pitch of said threads provided on the male member and adapted to engage substantially throughout its length with the first sealing surface to seal the joint, said second conical sealing surface having a faster taper than that of the first sealing surface whereupon initial contact between the sealing surfaces during make-up of the joint is on a circumferential line, and upon continued make-up of the joint said line contact generates into an area contact with radial deformation between the sealing surfaces.

References Cited in the file of this patent

UNITED STATES PATENTS

| | | |
|---|---|---|
| 816,155 | Dean | Mar. 27, 1906 |
| 2,006,520 | Stone et al. | July 2, 1935 |
| 2,062,407 | Eaton | Dec. 1, 1936 |
| 2,671,949 | Welton | Mar. 16, 1954 |

FOREIGN PATENTS

| | | |
|---|---|---|
| 539,139 | Great Britain | Aug. 28, 1941 |